United States Patent [19]
Bice et al.

[11] Patent Number: 5,787,216
[45] Date of Patent: Jul. 28, 1998

[54] FIBER SPLICING ASSEMBLY

[75] Inventors: Chester L. Bice, Powder Springs; Norvel R. Branham, Stone Mountain; Andrew Lewis Ingles, Alpharetta, all of Ga.

[73] Assignee: Lucent Technologies Inc., Murry Hill, N.J.

[21] Appl. No.: 794,720

[22] Filed: Feb. 3, 1997

[51] Int. Cl.$^6$ .................................................. G02B 6/255
[52] U.S. Cl. .................................. 385/97; 385/95; 385/98
[58] Field of Search .............................. 385/95–99, 12, 385/13

[56] References Cited

U.S. PATENT DOCUMENTS

| | | | |
|---|---|---|---|
| 4,102,717 | 7/1978 | Hensel | 385/95 |
| 5,029,972 | 7/1991 | Lukas et al. | 385/95 |
| 5,497,439 | 3/1996 | Piffaretti et al. | 385/97 |

*Primary Examiner*—Rodney B. Bovernick
*Assistant Examiner*—Hemang Sanghavi

[57] ABSTRACT

A fiber splicing assembly for making butt splices between fiber ends has a horizontal plate member having at least one groove therein containing a pair of fiber guiding rods, adjacent opposite ends of the groove are first and second ramp members which slope toward the guide rods at an angle to the plane of the plate member. Each ramp member has fiber holder guiding means thereon to guide a fiber within a holder toward and in to the V-groove formed by the guide rods. Magnetic means maintain the rods in a relatively fixed position, and the slope of the ramps is such that the bend created in the fiber tends to create a downward force on the fiber, forcing it into the V-groove.

The diameter of each of the guide rods is such that the fiber is guided into the V-groove despite undesirable bends in the free end of the fiber.

16 Claims, 5 Drawing Sheets

FIBER SPLICING ASSEMBLY

FIELD OF INVENTION

This invention relates to optical fiber production and testing and, more particularly, to an apparatus for making temporary fiber splices for testing purposes.

BACKGROUND OF THE INVENTION

Optical fibers possess signal transmission capabilities which vastly exceed those of metallic conductors. Among the advantages to be gained through the use of optical fibers, as opposed to, for example, copper conductors, are extremely broad bandwidth and relatively low loss, thus, the communications industry relies more and more on optical fiber for signal transmission, especially where such transmission is over great distances. Despite the advantages to be gained through the use of optical fibers, the fibers themselves possess certain inherent disadvantages which must be overcome in order for their full potential to be realized.

Among these disadvantages are the brittleness of the fiber, making the fiber prone to breakage if bent too sharply or if subject to an even small amount of tensile stress. Also, even slight damage to the fiber during production, for example, or in use, such as nicks, can cause a degeneration of the transmission capability. For these reasons, among others, optical fibers are monitored and tested at various stages of the production process, one of the most important tests being performed on the fiber after completion of the production process and after the fiber has been wound upon a storage spool to await ultimate use. This test is usually performed with an optical time domain reflectometer (OTDR) which launches a signal into the fiber at one end thereof and which measures and analyzes the reflected signal returning from the other fiber end. Inasmuch as the spools can contain up to one hundred kilometers of fiber wound thereon, although they usually contain somewhat less than that length, it is extremely important that this test be performed as a production step prior to storage and shipping. Although hereinafter the discussion will be directed toward OTDR testing, it is to be understood that the present invention is useful in the performance of numerous other types of testing, which can be performed at other stages of production or during or subsequent to storage. Thus, a purchaser need not perform such tests on the spooled fibers after they have been received from the manufacturer.

A problem arises in performing the OTDR test as a consequence of the necessity of coupling the OTDR, for example, to the fiber. Connection of an OTDR directly to the fiber end for each spool would be both labor intensive and time consuming, which are anathemas to the mass production process. As a consequence, it is the practice in the art to connect the OTDR to a length of fiber, and then temporarily butt splice that length of fiber to the end of the fiber under test. In order for the test to be meaningful, the splice must be accurately made, which means that the test operator must exercise a great deal of care in making the splice, which again is labor intensive and time consuming. There are numerous arrangements in the prior art aimed at accomplishing the desired butt splice expeditiously, with a minimum of operator effort.

In one arrangement of the prior art, the fiber from the OTDR rests in a V-shaped groove and the fiber under test is slid along the groove to where it butts against the end of the OTDR fiber. Index matching fluid is applied to the junction to minimize reflections, and the fibers are held tightly within the V-shaped groove by means of a vacuum system. Such an arrangement works reasonably well except that, over a period of time, the vacuum sucks out the matching fluid, which must be continually replaced.

There are commercially available various arrangements for accomplishing temporary butt-splicing of fibers. One such apparatus is made by Aesa Cortaillod of Switzerland. In this apparatus, each of the fibers to be tested is mounted in a special cylinder which grips the fiber, and the cylinder is then mounted on a magnetic cartridge which can hold, for example, up to twelve cylinders. The free end of the individual fiber is placed between aligning rods which are magnetically held in place and which form a guide path for the fiber as it is slid into contact with the OTDR fiber. Index matching fluid is used to reduce reflection losses at the butt. Such an arrangement has been found to function quite well normally, but it is somewhat complicated and time consuming. In addition, it has been found that when the free end length of fiber to be tested has, for example, a slight bend in it, it sometimes will not align itself with the rods, thus preventing the realization of the butt splice.

SUMMARY OF THE INVENTION

The present invention, in a preferred embodiment thereof, makes possible the formation of butt splices in a simple, expeditious manner without requiring any expertise, dexterity, or, more importantly, acute eyesight, in aligning the fibers for the butt splice. Inasmuch as it makes possible the formation of butt splices quickly and easily, it materially decreases the time consumed in testing fibers wound upon a spool. Furthermore, it materially reduces operator fatigue in the performance of hundreds of splices during a single work shift.

The invention comprises a base member having a planar insert therein which has a rectangular shaped groove extending thereacross. Both the fiber extending from the test equipment and the fiber to be tested are held in holders which, in turn, are movably mounted on ramps oriented at an angle to the planar insert. Within the groove is a pair of locator rods of magnetic material each of which has a diameter related to the fiber diameter such that even with a bend in either fiber, the rods, which form, in effect, a V-groove, tend to cam the fiber into the groove. The angular orientation of the fiber holders is such that the inherent stiffness of the fiber forces it down into the V-groove and holds it there without requiring a vacuum or other means to hold it. With the OTDR test fiber in place, within the groove, the holder of the fiber to be tested is slid down the ramp, causing the fiber to slide along the V-groove until it butts against the test fiber. With the addition of index matching compound at the butt, a good temporary splice is achieved and tests may then be performed.

In greater detail, the ramp has a locating guide strip extending along the surface of the ramp for aligning the fiber in the fiber holder with the V-groove formed by the rods. In addition, the ramp has a transversely extending stop strip which prevents further forward movement of the fiber holder. In practice, the fiber to be tested is cut to a predetermined length extending beyond the end of the fiber holder such that the fiber end just butts against the end of the test fiber. This predetermined length is imparted to the fiber by a fiber cleaver which, when properly set, eliminates any necessity of measuring the fiber length. Each of the ramp members is adjustably fixed to the base member and contains one or more magnets therein for holding the fiber holder to the surface of the ramp.

In the test procedure, the operator mounts the fiber, after stripping, in the fiber holder, mounts the holder on the cleaver to cut the free end of the fiber to the proper length, places the fiber holder on the angularly oriented ramp surface, and slides the holder down the ramp until the test fiber and the fiber under test butt against each other. The entire operation for achieving the splice can be performed in the matter of one or two minutes, and tests can then be performed.

The principles and features of the present invention will be more readily understood from the following detailed description, read in conjunction with the accompanying drawings.

DETAILED DESCRIPTION

The present invention is a splicing apparatus which, in a preferred embodiment thereof, achieves butt splicing of optical fibers in a reliable and greatly simplified manner, thereby, among other advantages, greatly reducing the need for special skills and acute eyesight on the part of the operator, and also greatly reducing operator fatigue in performing hundreds of such splices in a work shift.

Figure 1:
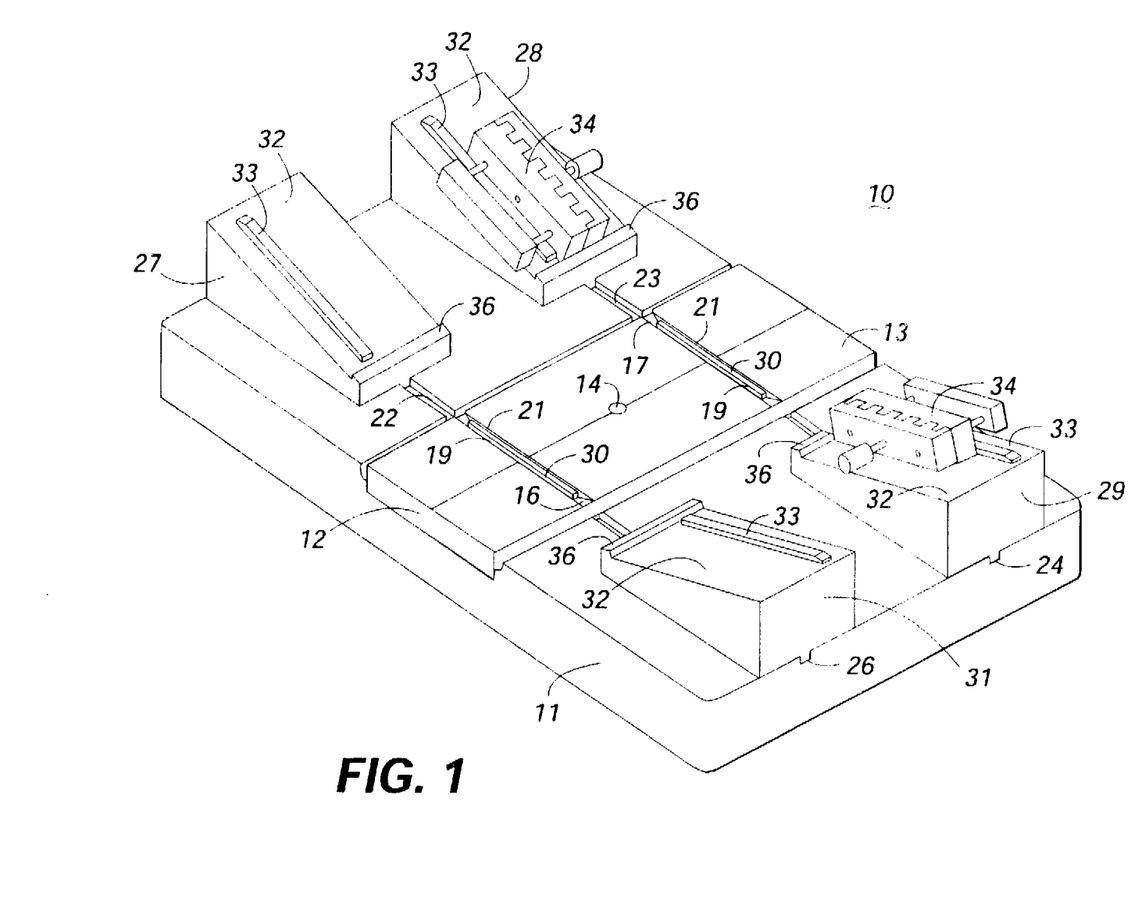
FIG. 1 is a perspective view of the apparatus of the invention.
Figure 3A:
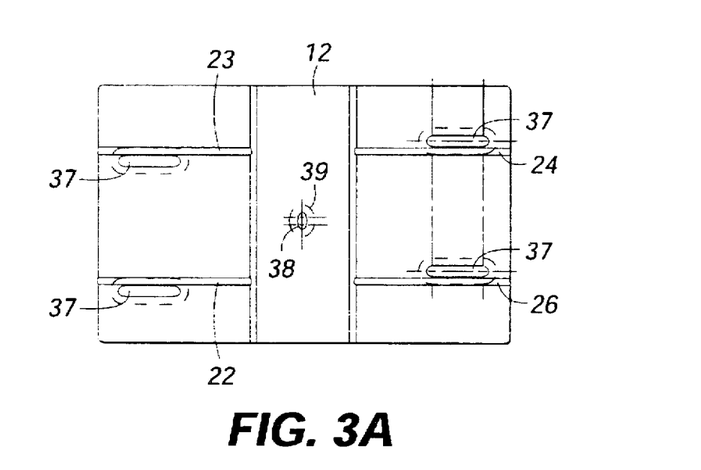
FIG. 3A is a plan view of the base member of FIG. 2.

FIG. 1 is a perspective view of a preferred embodiment 10 of the invention which comprises a base member 11 of suitable metallic material such as aluminum or steel. Member 11 has a centrally located transverse channel 12 extending thereacross in which is located a plate member 13, secured to base member 11 preferably by a bolt 14. Extending transversely of plate member 13, and hence, longitudinally of base member 11 are first and second rectangular locating grooves 16 and 17 which contain fiber locating rods 19 and 21, which are made of steel or other magnetic material. As will be apparent hereinafter, the locating rods 19 and 21 when in place within the grooves 16 and 17 form between them a V-shaped channel or groove 30 for aligning the fibers to be butt spliced. Extending longitudinally of base 11 and in alignment with rectangular grooves 16 and 17 are keyways 22, 23, 24, and 26 which are adapted to contain and align fiber holding ramps 27, 28, 29 and 31, which, as can be seen, are sloped toward the plate 13, with said rectangular grooves. Ramps 27, 28, 29, and 31 are preferably made of steel and are adjustably bolted to base member 11, as will be discussed more fully hereinafter. Each of the ramps 27, 28, 29, and 31 has a sloped surface 32 along which extends an alignment strip 33 for aligning a fiber holder 34, two of which are shown, with the grooves 16 and 17, and hence with the V-shaped groove 30. A stop strip 36 extends transversely across each that end of each of the ramps that is nearest the plate 13 to prevent further movement of the fiber holder 34 when it is slid down the ramp surface 32. Each of the ramps 27, 28, 29, and 31 is fixed to the base 11 by means of a bolt, not shown, which rides in elongated slots 37, which are best seen in FIG. 3A. In the initial set-up of the apparatus, the ramps are slid along the keyways 22, 23, 24, and 26 until they are so located relative to plate 13 that the predetermined lengths of fiber extending from the fiber holders 34 just butt against each other within the V-groove 30, at which position the ramps are then bolted in place.

In operation, with the ramps thus properly positioned, the fibers to be butt spliced are mounted in fiber holders and cleaved to the proper, predetermined length, as will be discussed hereinafter with reference to FIGS. 9 and 10. The holders are then positioned on the ramps and slid down to the stop strip, at which point the fibers just butt against each other, with, preferably, index matching fluid or gel therebetween. As will be explained in connection with FIG. 11, the rods 19 and 21 forming the V-groove 30 act to cam the fibers down into the V-groove so that the butting fibers are properly aligned. Thus a butt splice is realized and test may then be performed. One of the fiber holders 34 holds the fiber from the OTDR apparatus and is mounted, for example, on ramp 28 as shown in FIG. 1, while the end of the fiber to be tested is held in a holder 34 mounted on ramp 29.

Figure 2:
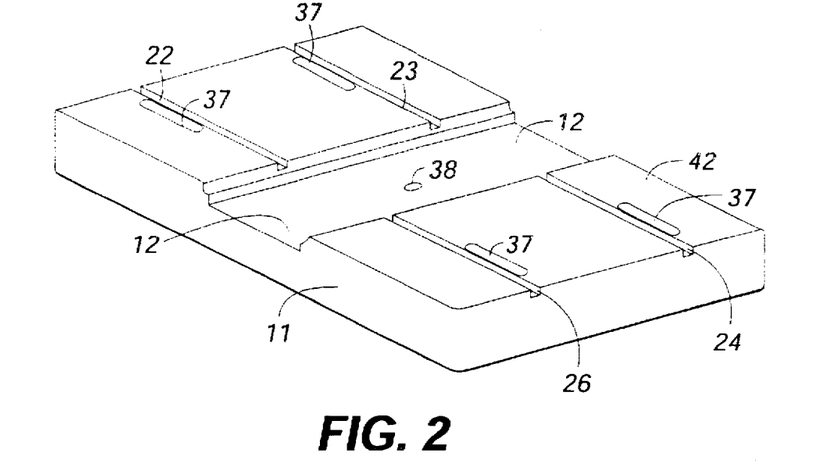
FIG. 2 is a perspective view of the base member of the apparatus of FIG. 1.
Figure 3B:
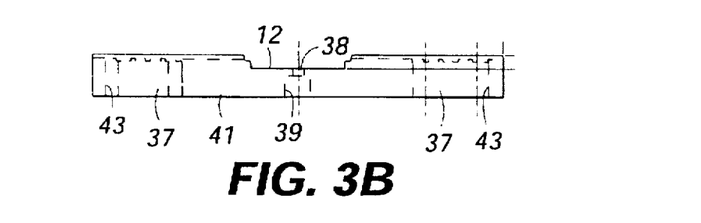
FIG. 3B is a side elevation view of the base member of FIGS. 2 and 3A.
Figure 4:
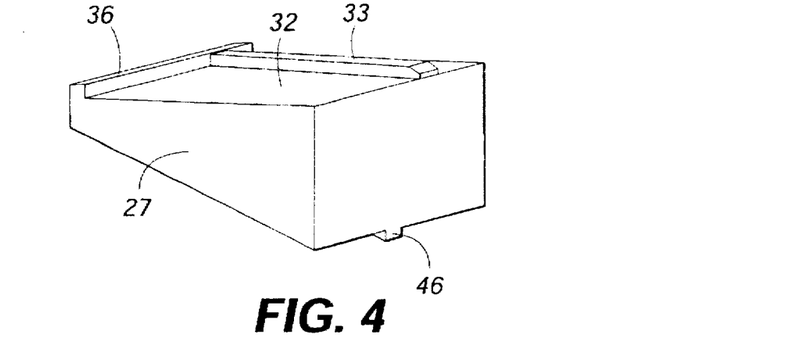
FIG. 4 is a perspective view of a ramped fiber holder component of the present invention.
Figure 5A:
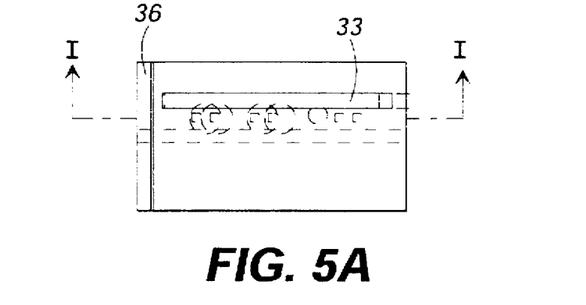
FIG. 5A is a plan view of the ramp component of FIG. 4.
Figure 5B:
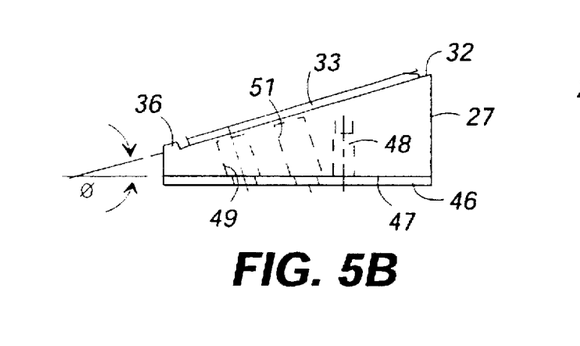
FIG. 5B is a side elevation view of the ramp component of FIG. 4.
Figure 5C:
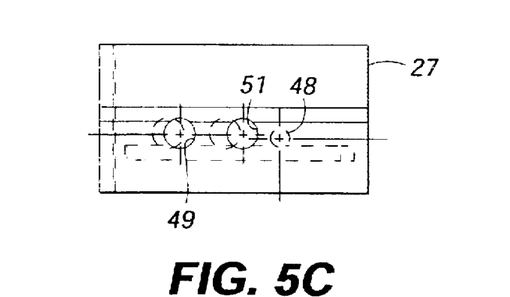
FIG. 5C is a bottom plan view of the ramp component of FIG. 4.
Figure 5D:
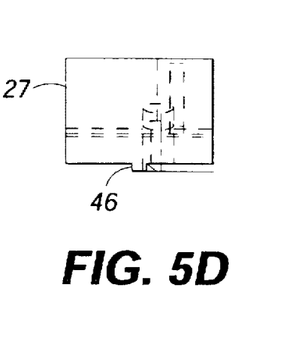
FIG. 5D is a rear elevation view of the ramp component of FIG. 4.
Figure 6:
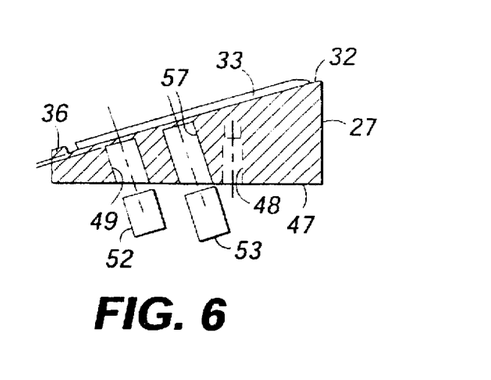
FIG. 6 is a cross-sectional view of the ramp component taken along the line I—I of FIG.
Figure 7:
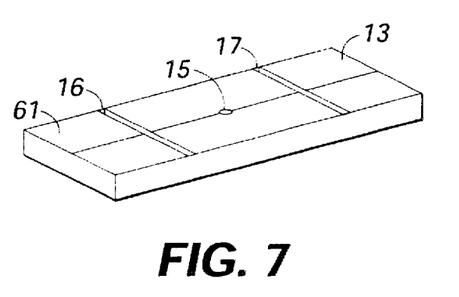
FIG. 7 is a perspective view of a guide component of the arrangement of FIG. 1.

FIGS. 2, 3A, and 3B are a perspective view, a plan view, and an elevation view respectively of the base 11, which is preferably made of steel, although other sufficiently rigid materials capable of being machined to fine tolerances might also be used. As discussed hereinbefore, base 11 has a transverse channel 12 machined or otherwise formed therein, with a bolt hole 38 for receiving bolt 14 located approximately centrally therein. As best seen in FIGS. 3A and 3B, bolt hole 38 has a countersunk portion 39 in the bottom surface 41 of base 11 for receiving the head of the bolt 14. Longitudinally extending keyways 22, 23, 24, and 26 are formed in the top surface 42 of base 11 for receiving, respectively, ramp members 27, 28, 29, and 31, as discussed hereinbefore. Adjacent the keyways 22, 23, 24, and 26 are slots 37 which also have countersunk portions 43 extending from the bottom surface 41 for receiving the bolts which affix the ramps members 27, 28, 29, and 31 to the base 11.

FIGS. 4, 5A, 5B, 5C, 5D, and 6 are differing views of a ramp member 27. Inasmuch as ramp members 27, 28, 29, and 31 are substantially identical to each other, it is only necessary to describe member 27, for example. As has been discussed hereinbefore, member 27 comprises a block of suitable material, such as aluminum or steel, having a sloping top surface 32 and a flat or bottom surface 47 having a key ridge 46 formed thereon which is dimensioned to be a slip fit in keyway 22 of member 11. The slope of surface 32 relative to the plane of the top surface of base 11 should be such that an optical fiber bends from the angle of the slope to the horizontal without unduly stressing the fiber and the inherent stiffness of the fiber tends to force it and hold it in the V-groove 30 formed by the rods 19 and 21. Desirably the bend in the fiber produces a downward force on the fiber to hold it in the V-groove. In practice it has been found that a slope angle Ø of approximately fourteen to eighteen degrees (14°–18°) relative to the plane of said member 11 achieves the desirable end. More particularly, a 17° angel appears to be excellent. As can be seen from the figures, especially FIGS. 5B, 5C, and 6, a threaded bolt hole 48 extends into member 27 from the bottom surface 47 thereof for receiving the bolt which affixes member 27 to base 11, as has been discussed in the foregoing. Member 27 likewise has first and second bores 49 and 51, the centerlines of which are normal to the plane of surface 32. Bores 49 and 51 hold magnets 52 and 53 respectively therein, which function to hold the fiber holder 34 firmly against surface 32.

Figure 8A:
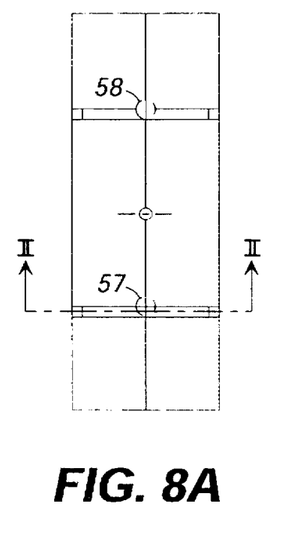
Fig. 8A is a plan view of the guide component of FIG. 7.
Figure 8B:
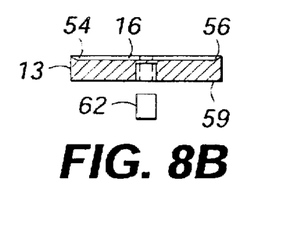
FIG. 8B is an elevation cross-sectional view of the guide component taken along the line II—II of FIG. 8A.
Figure 8C:
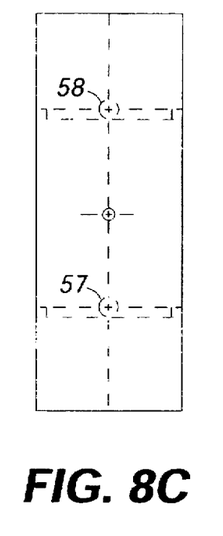
FIG. 8C is a bottom plan view of the guide component of FIG. 8A.
Figure 8D:
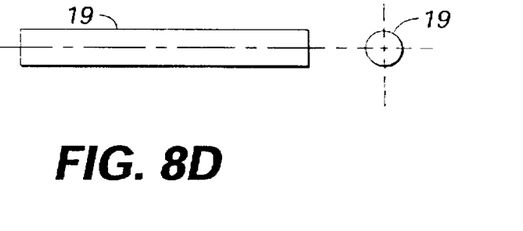
FIG. 8D is a side view and an end view of one of the fiber locating rods.
Figure 11:
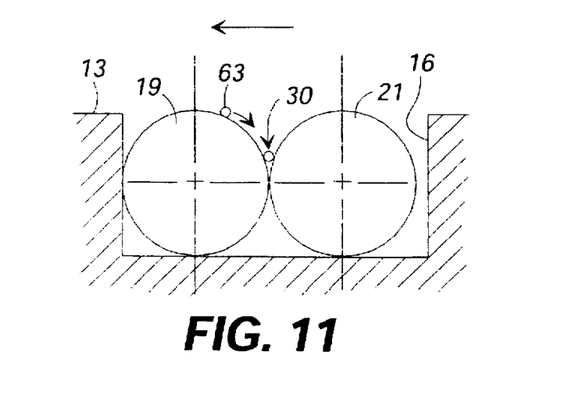
FIG. 11 is an enlarged elevation view of the guide component and guide rods illustrating the guiding process for the fiber to be spliced.

FIG. 7, 8A, 8B, and 8C are several views of the plate member 13 which fits into channel 12 of base 11 and is secured therein by bolt 14. Member 13 is preferably made of steel and has transverse locating grooves 16 and 17 extending thereacross. When member 13 is in position within channel 12, and bolted thereto by bolt 12, and bolted thereto by bolt 14 is threaded bore 15, grooves 16 and 17 are substantially aligned with keyways 22, 26 and 23, 24. Grooves 16 and 17 have a rectangular cross-section and, as best seen in FIG. 8B, have sloped ends 54 and 56. Along the centerline of plate member 13 and located under each of the grooves 16 and 17 are first and second bores 57 and 58 which extend from the bottom surface 59 toward the top surface 61 of member 13. Each bore 57 and 58 holds therein a magnet 62 each of which functions to hold the steel locating rods 19, 21 within the grooves 16 and 17. Bores 57 and 58 are slightly displaced from the center of their respective grooves, as best seen in FIGS. 8A and 8C to insure that one of the rods within the groove is forced against one wall of the groove when the allowable tolerances result in a groove being slightly greater in width than twice the diameter of the rods (and that the two rods are held firmly in side-by-side contacting relationship). One of the four substantially identical cylindrical side rods 19 and 21 is shown in FIG. 8D. Rod 19 is a steel rod of approximately 0.062 inches diameter preferably formed from gage stock and is preferably chrome plated. As noted hereinbefore, two of the rods 19 and 21 are located in each of the grooves 16 and 17 and held in place by the magnets 62. The orientation of the rods is best seen in FIG. 11, with the arrow indicating the direction of the magnetic force.

Figure 9:
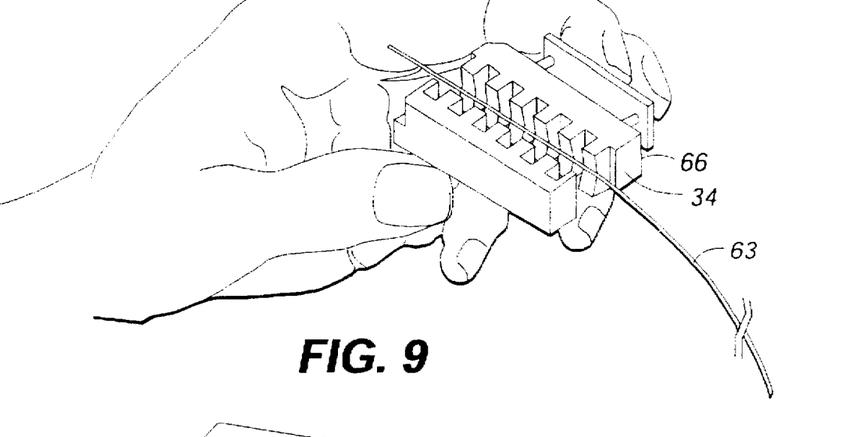
FIG. 9 is an illustrative view of the method of mounting a fiber in a fiber holder.
Figure 10:
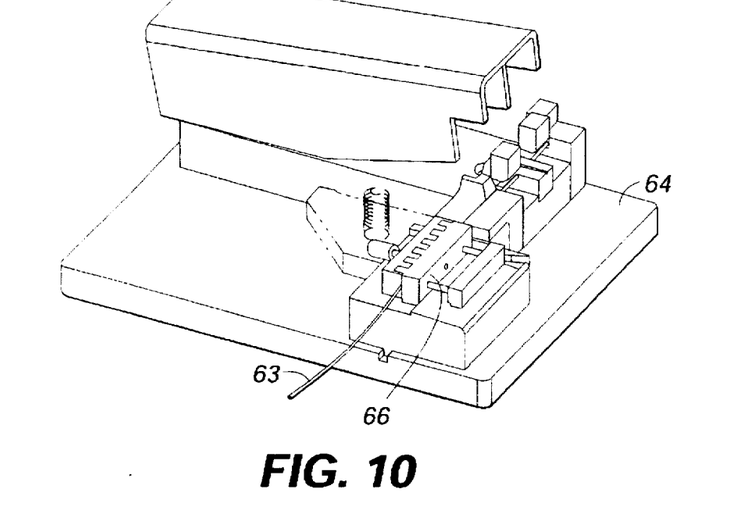
FIG. 10 is a perspective view of a fiber cleaver for use with the present invention.

FIGS. 9 and 10 illustrate the mounting of a fiber 63 in a standard holder 34, and cleaving of the fiber 63 in a cleaver apparatus 64 to insure that a proper, predetermined length of fiber, the end of which is to be butt spliced in accordance with the invention, protrude from holder 34. Holder 34 has a straight or planar surface 66 which, in operation, bears against the alignment strip 33 on ramp surface 32. The length of fiber 63 that protrudes from holder 34 is such that, when holder 34 is on ramp 29, for example, and bearing against stop strip 36, the end of the fiber reaches approximately to the centerline of plate member 13.

In operation, the free end of a fiber to be tested, such as the fiber wound upon a storage spool, is inserted into holder 34 with the free end protruding from the holder as shown in FIG. 9. The protruding end is then cleaved in cleaver 64 to the proper length and the holder is placed upon, for example, ramp 29. In a like manner, the fiber from the test equipment, such as an OTDR, is mounted in a holder 34 which is, after cleaving, placed upon ramp member 28. The OTDR fiber can be used for testing any number of fibers, hence it is not necessary to remount the fiber or to cleave it once the operation has been satisfactorily performed. As discussed hereinbefore, the fibers from ramps 28 and 29 butt against each other approximately at the centerline of plate member 13 and, after addition of index matching fluid, are fully prepared for the testing operation.

It so happens that, in some instances, the freed end of the fiber extending from the holder will have some curvatures or bend that prevents it from sliding directly into V-groove 30 formed by rods 19 and 21. In order to reduce the incidence of such a result the rod diameters are a large multiple of the fiber diameter so that the result depicted in FIG. 11 obtains. In FIG. 11 it can be seen that if the bend in fiber 63 is such that it first rides along the top of rod 19, for example, but is on the V-groove side of the centerline thereof, it will be cammed down into V-groove 30 as it is pushed along rod 19. In practice, it has been found that the desired result can be obtained for a base fiber of one hundred twenty-five microns diameter, which is standard, when the diameter of the plated rod 19 is preferably within the range of eleven to twenty-five times the diameter of the fiber. The lower end of the range is more critical than the upper, inasmuch as it is determinative of the action of the rod in overcoming the bend in the fiber. More particularly, excellent results have been obtained when each of the rods 19 and 21 has a diameter of approximately 0.0622 inches, thus making its diameter approximately 12 to 14 times the diameter of the fiber. On the other hand, the upper end of the range is governed more by what is a practical size for the rods and the rod grooves. Obviously, the greater the diameter of the rod, the greater the bend that can be successfully overcome, thus, where practical, a multiple of more than 25 might be used, so long as it is practical for the particular testing set-up.

The splicing mechanism of the present invention in the embodiment shown, makes possible the rapid and accurate formation of a butt splice between two fibers. No particular dexterity or acuteness of eyesight is necessary to achieve such a splice with the present invention and, as a consequence, hundreds of such splices can be performed in a given work shift.

It is to be understood that the various features of the present invention might be incorporated into other types of splicing mechanisms, and that other modifications or adaptations might occur to workers in the art. All such variations and modifications are intended to be included herein is being within the scope of the present invention as set forth. Further, in the claims hereinafter, the corresponding structures, materials, acts, and equivalents of all means or step-plus-function elements are intended to include any structure, material, or acts for performing the functions in combination with other elements as specifically claimed.

We claim:

1. A fiber splicing assembly comprising a planar base member;

a substantially planar plate member mounted on said base member, said base member having at least one transversely extending groove therein;

first and second fiber guiding rods located within said groove in side-by-side relationship and forming a substantially V-shaped channel therebetween;

a first ramp member mounted on said base member on one side of said plate member having a sloped surface sloping toward said plate member, said surface having a guide member thereon for aligning a fiber in a fiber holder with said V-shaped channel between said fiber guiding rods; and stop means on said surface of said first ramp member for limiting the length of a fiber introduced into said V-shaped channel.

2. A fiber splicing assembly as claimed in claim 1 and further comprising a second ramp member mounted on said base member on the side of said plate member from said first ramp member, said second ramp member having a surface sloping toward said plate member;

a guide member on said surface for aligning a fiber in a fiber holder with said V-shaped channel between said guide rods; and stop means on said surface of said second ramp member for limiting the length of a fiber introduced into said V-shaped channel.

3. A fiber splicing assembly as claimed in claim 1 wherein each of first and second rods is cylindrical in shape and has a diameter that is approximately eleven to twenty-five times the diameter of the fiber to be spliced.

4. A fiber splicing assembly as claimed in claim 3 wherein the diameter of each of said rods is approximately twelve to fourteen times the diameter of the fiber to be spliced.

5. A fiber splicing assembly as claimed in claim 1 and further comprising means for holding at least one of said rods tightly against a side wall of said groove and for holding said first and second rods firmly in side-by-side contacting relationship.

6. A fiber splicing assembly as claimed in claim 5 wherein said means for holding comprises a magnet contained in said plate member adjacent said groove.

7. A fiber splicing assembly as claimed in claim 6 wherein said magnet is offset from the centerline of the groove.

8. A fiber splicing assembly as claimed in claim 1 and further comprising holding means for holding a fiber holder firmly against said sloped surface of said ramp and against said guide member and said stop means.

9. A fiber splicing assembly as claimed in claim 8 wherein said holding means comprises at least one magnet housed in said ramp.

10. A fiber splicing assembly as claimed in claim 1 wherein the angle of slope of said sloped surface is approximately fourteen to eighteen degrees relative to the plane of said base member.

11. A fiber splicing assembly as claimed in claim 10 wherein the angle of slope of said sloped surface is approximately seventeen degrees.

12. A fiber splicing assembly comprising:

a planar base member;

a centrally located transverse channel in said base member;

a planar plate member in said channel and secured to said base member;

a first rectangular groove extending transversely to said plate member;

first and second fiber locating metallic rods located in said grooves in side-by-side relationship and forming a substantially V-shaped groove;

a first ramp member adjustably mounted on said base member adjacent one end of said groove;

a second ramp member adjustably mounted on said base member adjacent the other end of said groove;

each of said ramp members having a sloped surface that slopes toward said groove;

means for substantially aligning each of said ramp members with said groove;

an alignment strip on the sloped surface of each of said ramp members for aligning a fiber holder containing a fiber to be spliced with said V-groove; and a stop strip on each of said sloped surfaces for limiting the movement of a fiber holder on each of said sloped surfaces.

13. A fiber splicing assembly as claimed in claim 12 wherein each of said fiber locating rods is cylindrical in shape and has a diameter of approximately eleven to twenty-five times the diameter of a fiber to be spliced.

14. A fiber splicing assembly as claimed in claim 13 wherein each of said fiber locating rods has a diameter of approximately 0.0622 inches.

15. A fiber splicing assembly as claimed in claim 12 wherein the angle of slope of each of said sloped surfaces is approximately fourteen to eighteen degrees relative to the plane of said base member.

16. A fiber splicing assembly as claimed in claim 15 wherein the angle of slope of each of said sloped surfaces is approximately seventeen degrees relative to the plane of said base member.

* * * * *

United States Patent And Trademark Office
CERTIFICATE OF CORRECTION

PATENT NO. : 5,787,216
DATED       : July 28, 1998
INVENTOR(S): Chester L. BICE, Norvel R. BRANHAM, and Andrew Lewis INGLES It is certified that error appears in the above-identified patent and that said Letters Patent is hereby corrected as shown below.

Col. 6, line 63, after "said" delete "base" and replace with --plate--.

Signed and Sealed this

Ninth Day of March, 1999

Attest:

Q. TODD DICKINSON

Attesting Officer

Acting Commissioner of Patents and Trademarks